(12) United States Patent
Yoo et al.

(10) Patent No.: US 11,846,740 B2
(45) Date of Patent: Dec. 19, 2023

(54) FIRST BREAK PICKING FOR FULL WAVEFIELD TRAVEL-TIME INVERSION

(71) Applicant: SAUDI ARABIAN OIL COMPANY, Dhahran (SA)

(72) Inventors: Jewoo Yoo, Delft (NL); Young Seo Kim, Dhahran (SA); Roald van Borselen, Delft (NL)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 27 days.

(21) Appl. No.: 17/589,458

(22) Filed: Jan. 31, 2022

(65) Prior Publication Data
US 2023/0243990 A1 Aug. 3, 2023

(51) Int. Cl.
  *G01V 1/28* (2006.01)
  *G01V 1/34* (2006.01)
  *G01V 1/30* (2006.01)

(52) U.S. Cl.
  CPC .............. *G01V 1/282* (2013.01); *G01V 1/303* (2013.01); *G01V 1/345* (2013.01)

(58) Field of Classification Search
  CPC ......... G01V 1/282; G01V 1/303; G01V 1/345
  See application file for complete search history.

(56) References Cited

U.S. PATENT DOCUMENTS

| 7,508,735 B2 | 3/2009 | Grechka et al. |
| 8,553,499 B2 * | 10/2013 | Albertin .................. G01V 1/28 |
| | | 702/14 |
| 8,861,308 B2 | 10/2014 | Virgilio et al. |
| 9,442,204 B2 | 9/2016 | Krohn |

(Continued)

FOREIGN PATENT DOCUMENTS

| CN | 101630017 B | 12/2011 |
| GB | 2503640 A | 1/2014 |
| WO | 2012047384 A1 | 4/2012 |

OTHER PUBLICATIONS

Hu et al., "CAPS: Energy-Efficient Processing of Continuous Aggregate Quires in Sensor Network", 2006, IEEE Publication, pp. 1-10. (Year: 2006).*

(Continued)

*Primary Examiner* — Elias Desta
(74) *Attorney, Agent, or Firm* — Osha Bergman Watanabe & Burton LLP

(57) ABSTRACT

A method for picking first breaks on a synthetic seismic dataset for a full wavefield travel-time inversion is provided. This method includes obtaining a synthetic seismic dataset and for each synthetic trace, determining a plurality of synthetic trace amplitude maxima and minima, determining a modified energy ratio trace, and forming a trace mask based at least in part, on an amplitude of the synthetic trace and on an amplitude of the modified energy ratio trace. The method further includes determining for each synthetic trace, a positive estimated first break based on the plurality of synthetic trace amplitude maxima and the trace mask and a negative estimated first bread based on the plurality of synthetic trace amplitude minima and the trace mask. The method concludes with determining a predicted first break for each synthetic trace from the positive estimate first break and the negative estimate first break.

20 Claims, 11 Drawing Sheets

(56) References Cited

U.S. PATENT DOCUMENTS

| | | |
|---|---|---|
| 10,955,576 B2 * | 3/2021 | Pattnaik ................ E21B 41/00 |
| 2016/0047924 A1 | 2/2016 | Krohn et al. |
| 2016/0178772 A1 | 6/2016 | Carter |
| 2018/0335531 A1 | 11/2018 | Ratcliffe et al. |
| 2019/0324167 A1 | 10/2019 | Zhang |
| 2020/0158899 A1 | 5/2020 | Li et al. |

OTHER PUBLICATIONS

J. Chen et al. "Comparison of Full Wavefield Synthetics with Frequency-Dependent Traveltimes Calculated Using Wavelength-Dependent Velocity Smoothing" Journal of Environmental and Engineering Geophysics (JEEG), vol. 22, Issue 2; Jun. 2017 (9 pages).

F. Boschetti et al. "A fractal-based algorithm for detecting first arrivals on seismic traces" Geophysics, vol. 61, No. 4; 1996 (8 pages).

R. Peraldi et al. "Digital Processing of Refraction Data Study of First Arrivals" Geophysical Prospecting, vol. 20; 1972 (20 pages).

J. I. Sabbione et al. "Automatic first-breaks picking: New strategies and algorithms" Geophysics, vol. 75, No. 4; 2010 (10 pages).

J. Wong et al. "Picking of first-arrival times on very large seismic datasets" Crewes; University of Calgary; 2009 (4 pages).

K. Xu et al. "First-arrival Waveform Inversion Using Low-frequency Regenerated Data" SEIMAX Technologies; SEG Technical Program Expanded Abstracts; 2016 (5 pages).

* cited by examiner

FIRST BREAK PICKING FOR FULL WAVEFIELD TRAVEL-TIME INVERSION

BACKGROUND

Seismic surveys are frequently conducted by participants in the oil and gas industry. Seismic surveys are conducted over subsurface regions of interest during the search for, and characterization of, hydrocarbon reservoirs. In seismic surveys, a seismic source generates seismic waves that propagate through the subterranean region of interest and are detected by seismic receivers. The seismic receivers detect and store a time-series of samples of earth motion caused by the seismic waves. The collection of time-series of samples recorded at many receiver locations generated by a seismic source at many source locations constitutes a seismic data set.

To determine earth structure, including the presence of hydrocarbons, the seismic data set may be processed. Processing a seismic data set includes a sequence of steps designed to correct for a number of issues such as near-surface effects, noise, irregularities in the seismic survey geometry, etc. A properly processed seismic data set may aid in decisions as to if and where to drill for hydrocarbons.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, embodiments relate to a method for picking first breaks on a synthetic seismic dataset for a full wavefield travel-time inversion. This method includes obtaining a synthetic seismic dataset and for each synthetic trace, determining a plurality of synthetic trace amplitude maxima and minima, determining a modified energy ratio trace and forming a trace mask based at least in part, on an amplitude of the synthetic trace and on an amplitude of the modified energy ratio trace. The method further includes determining for each synthetic trace, a positive estimated first break based on the plurality of synthetic trace amplitude maxima and the trace mask, and a negative estimated first break based on the plurality of synthetic trace amplitude minima and the trace mask. The method concludes with determining a predicted first break for each synthetic trace from the positive estimate first break and the negative estimate first break.

In general, in one aspect, embodiments relate to a non-transitory computer readable medium storing instructions executable by a computer processor, the instructions including functionality for obtaining a synthetic seismic dataset, determining for each synthetic trace, a plurality of synthetic trace amplitude maxima and minima, determining a modified energy ratio trace, and forming a trace mask based at least in part, on an amplitude of the synthetic trace and on an amplitude of the modified energy ratio trace. The instructions also include functionality for determining for each synthetic trace, a positive estimated first break based on the plurality of synthetic trace amplitude maxima and the trace mask and a negative estimated first break based on the plurality of synthetic trace amplitude minima and the trace mask and determining a predicted first break for each synthetic trace from the positive estimate first break and the negative estimate first break.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In some embodiments, first break picking may involve the identification of the time at which the first seismic wave is detected at a receiver. First break picking may be performed on recorded seismic data. First break picking may also be performed on simulated or synthetic wavefields such as those used in full wavefield travel-time inversion (FWTI).

Figure 1:
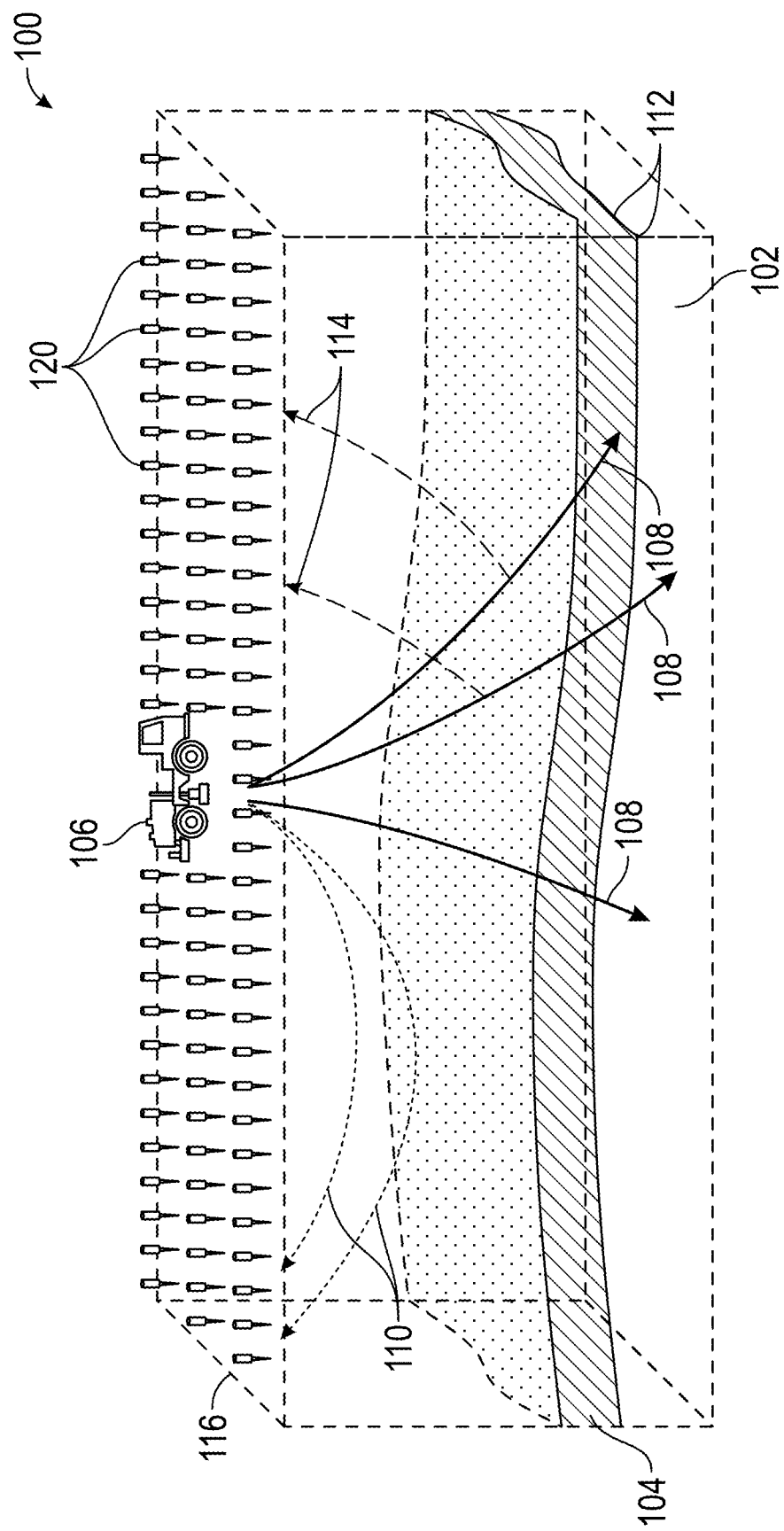
FIG. 1 depicts a seismic survey in accordance with one or more embodiments.

FIG. 1 shows a seismic survey (100) of a subterranean region of interest (102), which may contain a reservoir (104). The seismic survey (100) may utilize a seismic source (106) on the surface of the earth (116) that generates radiated seismic waves (108). The radiated seismic waves (108) may return to the surface as refracted seismic waves (110) or may be reflected by geological discontinuities (112) and return to the surface as reflected seismic waves (114). At the surface, the refracted seismic waves (110) and reflected seismic waves (114) may be detected by seismic receivers (120).

Figure 2:
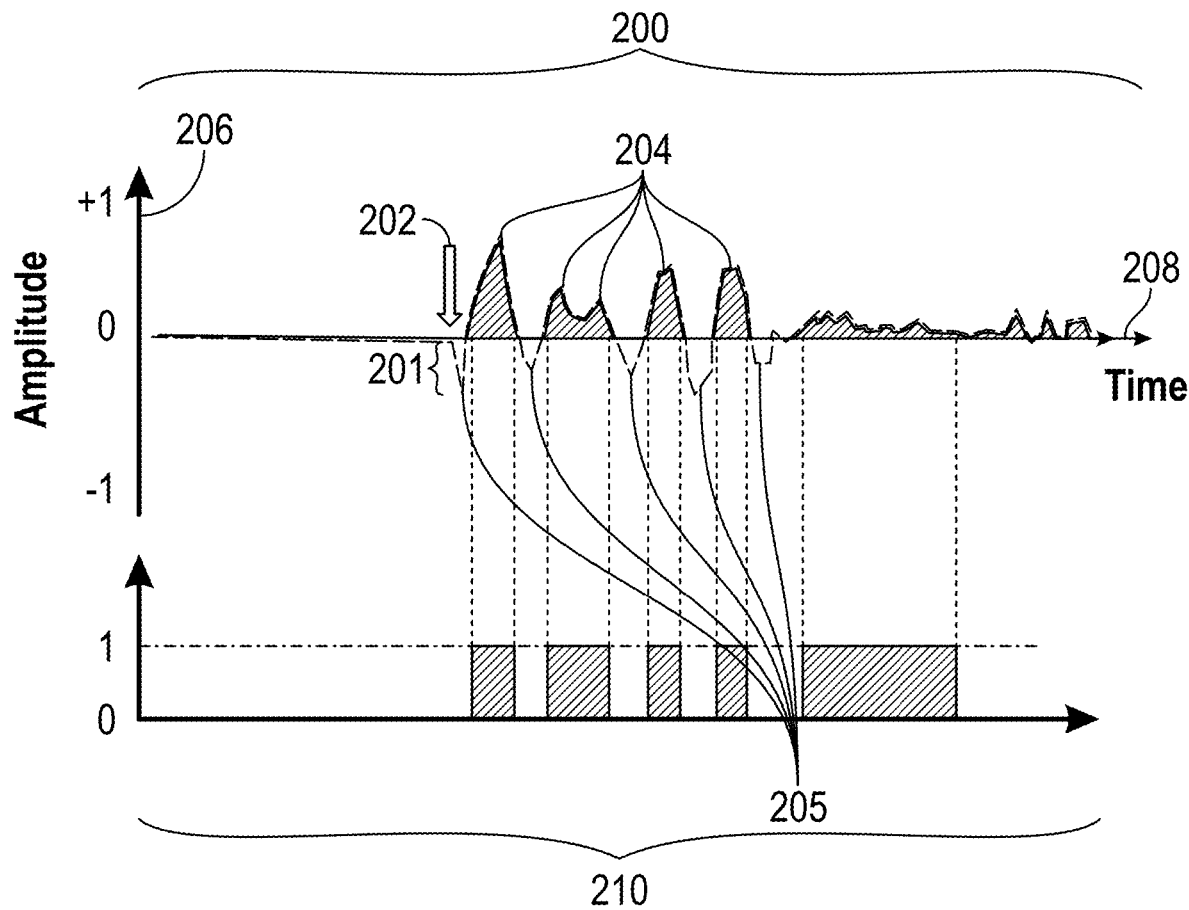
FIG. 2 shows a seismic trace in accordance with one or more embodiments.

In some embodiments, the refracted seismic waves (110) and reflected seismic waves (114) generated by a single activation of the seismic source (106) are recorded by a seismic receiver (120) as a time-series representing the amplitude of ground-motion at a sequence of discreet times. This time-series may be denoted a seismic "trace" (200) as shown in FIG. 2. The seismic receivers (120) are positioned at a plurality of seismic receiver locations that we may denote $(x_r, y_r)$ where x and y represent orthogonal axes on the surface of the earth (116) above the subterranean region of interest (102). Thus, the refracted seismic waves (110) and reflected seismic waves (114) generated by a single activation of the seismic source (106) may be represented as a three-dimensional "3D" volume with axes $(x_r, y_r, t)$ where $(x_r, y_r)$ represents the location of the seismic receiver (120) and t delimits the time sample at which the amplitude of ground-motion was measured.

A seismic survey (100) also may include recordings of seismic waves generated by a seismic source (106) that is positioned at a plurality of seismic source locations denoted $(x_s, y_s)$. Thus, all the data acquired by a seismic survey (100) may be represented as a five-dimensional volume, with coordinate axes $(x_s, y_s, x_r, y_r, t)$ and denoted a "seismic data set".

A seismic data set must be processed to generate a seismic velocity model of the subterranean region of interest (102) or an image of seismic reflectors within the subterranean region of interest (102). Seismic reflectors may be of the geological boundaries, such as the boundaries between geological layers, the boundaries between different pore fluids, faults, fractures or groups of fractures within the rock.

Processing a seismic data set comprises a sequence of steps designed, without limitation, to do one or more of the following: correct for near surface effects; attenuate noise; compensate for irregularities in the seismic survey geometry; calculate a seismic velocity model; image reflectors in the subsurface; calculate a plurality of seismic attributes to characterize the subterranean region of interest (102); and aid in decisions governing where to drill for hydrocarbons.

An observed seismic dataset may be acquired by activating a physical seismic source and recording the actual resulting vibrations of the earth using physical seismic receivers. The observed seismic dataset may be composed of a plurality of observed seismic traces each recorded using a physical seismic receiver. In contrast, a synthetic seismic dataset may be simulated by solving a wave equation, such as the acoustic, elastic, or viscoelastic wave equations, for at least one simulated seismic source location and a plurality of seismic receiver locations. Typically, the wave equation is solved using a powerful computer system.

FIG. 2 shows a seismic trace (200) and a first mask (210) on a seismic trace in accordance with one or more embodiments. One step typically employed early in the processing of a seismic data set involves picking the arrival time ("first break") (202) of a first arriving event (201) for each seismic trace (200). A first arriving event (201) is the earliest arrival of energy propagated from a seismic source (106) to a receiver (120) and recorded on a seismic trace (200). The first break (202) may be used to estimate and compensate for "statics correction" that are caused by, without limitation, localized changes in the elevation of the ground surface on which the seismic survey is collected, and localized changes of the seismic velocity close to the surface. In addition, the first break (202) may be used in steps later in the seismic data processing, such as in determining seismic velocity models.

FIG. 2 shows a seismic trace (200) plotted as vibration amplitude versus time. In this case, the time series is plotted with amplitude indicated on the vertical axis (206) and time on the horizontal axis (208). FIG. 2 depicts the first arriving event (201) at a first break (202), a plurality of local maxima (204) and a plurality of local minima (205).

For each trace, a maxima trace is computed having a value of unity at each local maximum (204) and a zero value elsewhere. In particular, in accordance with one or more embodiments, the local maxima (204) is given by:

$$l_{max}(x, t) = \begin{cases} 1, & d(x, t-1) \le d(x, t) \text{ and } d(x, t+1) \le d(x, t) \\ 0, & \text{elsewhere} \end{cases} \quad \text{Equation (1)}$$

where $l_{max}(x, t)$ is the local maxima (204) containing each extremum of a seismic trace (200), labeled by its spatial index x, and by its time index t.

In accordance with one or more embodiments, a first mask on a seismic trace (210) may be performed by first balancing the amplitude of the local maxima (204) for the seismic trace (200). Amplitude balancing may be performed to scale any anomalous trace amplitudes that may exist in the synthetic dataset and may be written as:

$$d_{amp}(x, t) = \sqrt[5]{(d(x, t))^2} \quad \text{Equation (2)}$$

The first mask on a seismic trace (210), in accordance with one or more embodiments, may then be determined by amplitude thresholding. Amplitude thresholding may describe a method in which anomalous amplitudes above and/or below a certain threshold are removed from a dataset and may be written as:

$$m_1(x, t) = \begin{cases} 1, & d_{amp}(x, t) > k_1(x) \\ 0, & \text{else} \end{cases}, \quad \text{Equation (3)}$$

$$\text{where } k_1(x) = \frac{0.2}{n_t} \sum_{t=1}^{n_t} d_{amp}(x, t)$$

where the mask created from the amplitude thresholding will have a value of zero when the positive definite function is smaller than the threshold determined and will have a value of one when the positive definite function is larger than the threshold, as illustrated in the first mask (210). The methods to compute the local maximum (204) for a seismic trace (200) and determining a first mask (210) on a seismic trace may be expanded to include computing local maxima (204) for a plurality of seismic traces (200) and determining a first mask for a two-dimensional ("2D") synthetic seismic dataset shown in more detail in FIGS. 3A-D.

Figure 3A:
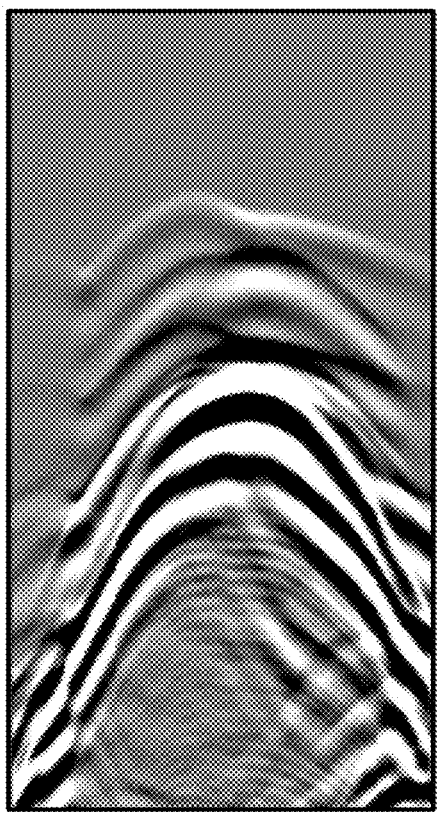
FIGS. 3A-3D show seismic data processing steps in accordance with one or more embodiments.

FIG. 3A shows an example of a synthetic seismic dataset. In accordance with one or more embodiments, first breaks (202) may also be picked on a synthetic seismic dataset. A synthetic seismic dataset may have advantageous characteristics for picking accurate first breaks (202) due to no external noise and no source and receiver irregularities. Those characteristics may be that the amplitude of the first arriving event (201) is clearly distinguishable in the near offset region and the first arriving event (201) is entirely continuous for the synthetic seismic dataset. First breaks (202) for a synthetic seismic dataset may be used in velocity estimation methods, such as full wavefield travel-time inversion. Full wavefield travel-time inversion may be used as a method to recover a subsurface model by minimizing travel-time differences between the first breaks (202) of the observed and synthetic seismic dataset. The first break picking in the synthetic seismic dataset is a key element for full wavefield travel-time inversion and must be precisely computed during numerous iterations.

Figure 3B:
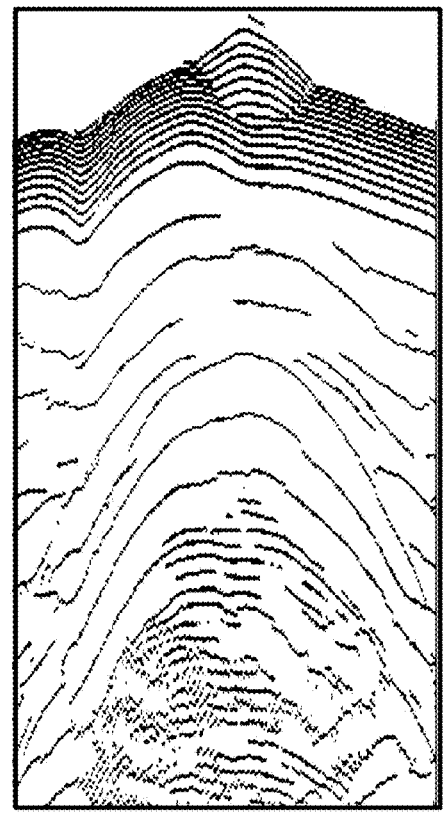
Figure 3C:

A synthetic seismic dataset (may be used in Equation (1) to generate an array of local maxima, shown in FIG. 3B. This array of local maxima contains valuable first arriving event (201) amplitude information gathered in the near offset. Because the synthetic seismic dataset has a clear distinguishable first arriving event (201), a first mask on a synthetic seismic dataset (FIG. 3C) may be created from the array of local maxima dataset according to Equation (2) and (3). The first mask on a synthetic seismic dataset will have a value of zero when the positive definite function is smaller than the threshold determined and will have a value of one when the positive definite function is larger than the threshold. This threshold is determined, at least in part, from an average value of the positive definite function.

Figure 3D:
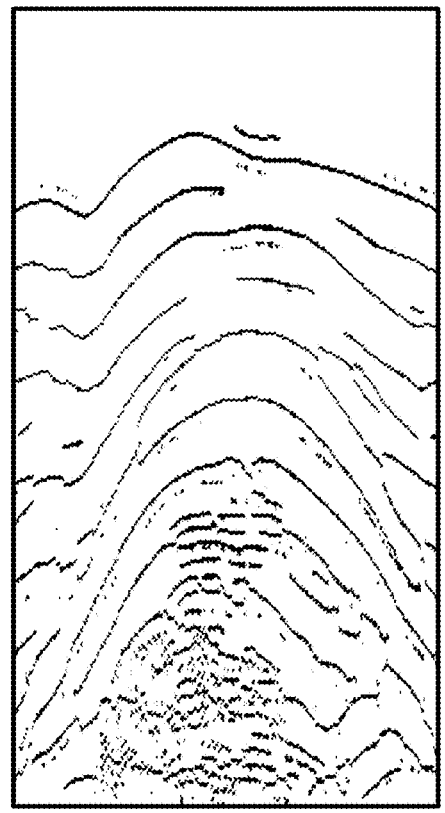

A second mask, shown in FIG. 3D, may be created in accordance with one or more embodiments. The second mask is based on a modified energy ratio trace of wavefield energy within a leading time window divided by wavefield energy within a trailing time window, where the second mask is non-zero only at points where the modified energy ratio trace exceeds a certain threshold. The second mask is based on an amplitude of this modified energy ratio trace and an amplitude of the synthetic trace. This modified energy ratio (MER) method, whereby an energy ratio, M, is computed for each synthetic trace, as:

$$M(t) = \left\{ \left( \sum_{i=t}^{t+n_e} |s_i^2| / \sum_{i=t-n_e}^{t} |s_i^2| \right) |s_i| \right\}^3 \quad \text{Equation (4)}$$

where t is a time index, $s_i$, is the amplitude of the seismic trace at the i-th time index and $n_e$ is the number of time samples in a moving time-window before and after the time t. The first break (202) of the first arriving event (201) for each trace is then identified as the time at which M attains its maximum value.

The MER method may be applied to a synthetic seismic data set acquired over subterranean regions of interest to find the first break (202) of the first arriving event (201). This modified energy ratio (MER) trace has a peak value very close to first break times, especially in areas with a high signal-to-noise ratio.

Once the MER trace has been generated, in accordance with one or more embodiments, amplitude thresholding may be applied for the attribute as:

$$M'(x, t) = \begin{cases} M(x, t), & M(x, t) > k_2(x) \\ 0, & \text{else} \end{cases} \quad \text{Equation (5)}$$

where $k_{2(x)}$ is the top 20% amplitude in the trace and the second mask (FIG. 3D) is given once again by thresholding, written as:

$$m_2(x, t) = \begin{cases} 1, & t = t' + l/2 \text{ when } \prod_{i=t'}^{t'+l} M'(x, i) \neq 0 \\ 0, & \text{else} \end{cases} \quad \text{Equation (6)}$$

where the second mask created will have a non-zero value only at the central points of the non-zero periods of MER attribute after amplitude thresholding. The vertical axis in FIGS. 3A through 3D represents the horizontal location and the horizontal axis represents time or depth increasing downward.

Figure 4A:
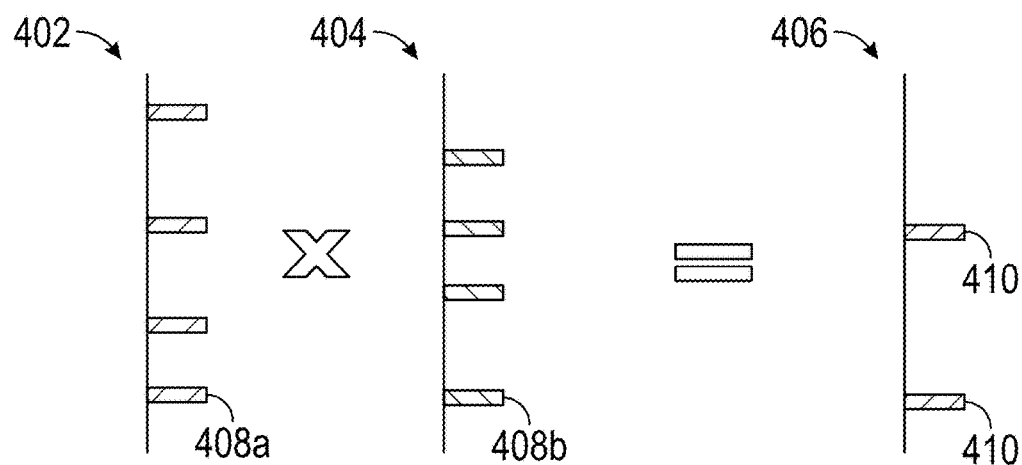
FIGS. 4A-4C show seismic data processing steps in accordance with one or more embodiments.
Figure 4B:
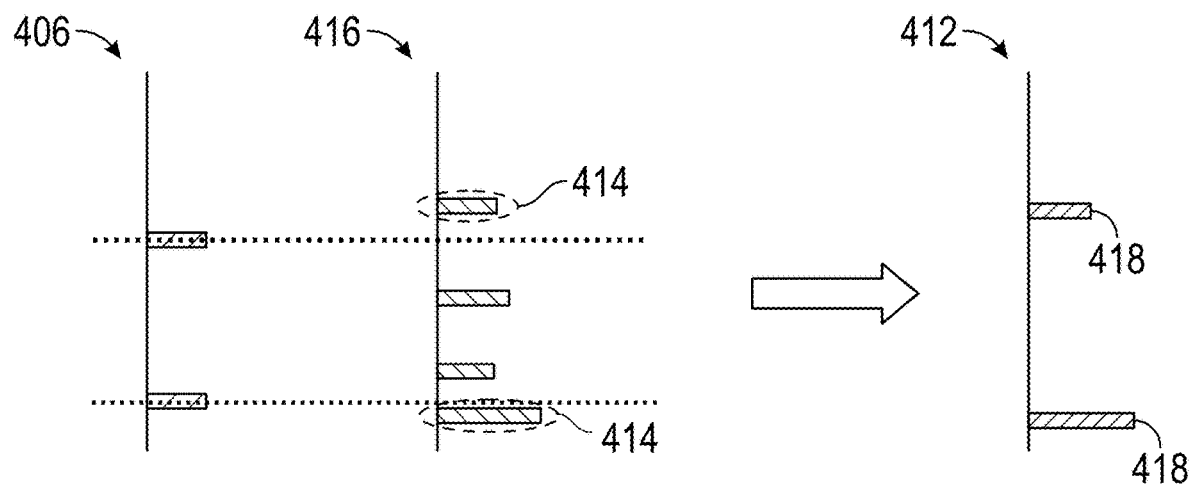

FIGS. 4A and 4B describe the creation of a third mask for a trace in accordance with one or more embodiments. In FIG. 4A the first mask for a trace (402) is shown with non-zero values (408a) and a second mask for the trace (404) is shown with non-zero values (408b). The first mask for a trace (402) is multiplied with the second mask for the trace (404) in accordance with one or more embodiments. A new mask (406) is thus created from the multiplication where the non-zero values (410) are located where both the first mask (402) and the second mask (404) share the same non-zero value (408a, 408b) location.

Figure 4C:
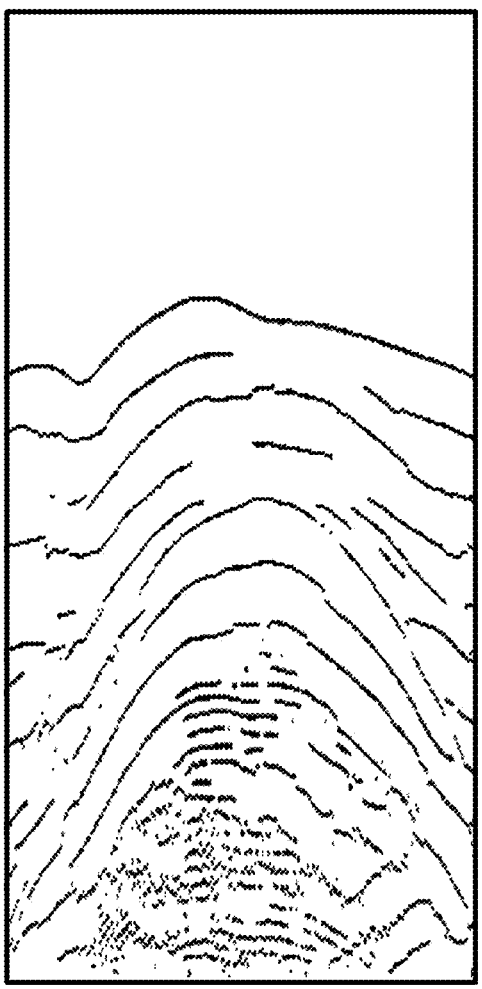

In FIG. 4B a third mask (412) for a trace or a trace of processed data is created by using the location of the non-zero values (410) from the new mask (406) to determine the closest local maxima (414) on a trace of local maxima (416). The nonzero values (418) in the trace of processed data (412) are always located at a corresponding local maximum (204). The trace of the processed data (412) can be extended to include all the traces for a processed synthetic seismic dataset as shown in FIG. 4C. The vertical axis in FIG. 4C represent the horizontal location and the horizontal axis represents time or depth increasing downward. This processed synthetic seismic dataset may be obtained, for example, by methods such as Algorithm 1 found below:

---
Algorithm 1. Computing processed
data from the 1$^{st}$ and 2$^{nd}$ masking
---

```
Input : m₁(x, t), m₂(x, t), and l_max(x, t)
Output : p(x, t)
 1:   n ← the number of traces
 2:   nt ← the number of time samplings
 3:   m(x, t) ← m₁(x, t) * m₂(x, t)
 4:   ∀p(x, t) = 0
 5:   for x = 0 to x = x_n do
 6:      for t = 0 to t = t_nt do
 7:         if m(x, t) ≠ 0 then
 8:            i₁ = 0
 9:            for j = t to j = 0 do
10:               if l_max(x, j) ≠ 0 then
11:                  i₁ ← j
12:                  exit
13:               end if
14:            end for
15:            i₂ = t_nt
16:            for j = t to j = t_nt do
17:               if l_max(x, j) ≠ 0 then
18:                  i₂ ← j
19:                  exit
20:               end if
21:            end for
22:            if t − i₁ ≤ i₂ − t then
23:               p(x, i₁) = 1
24:            else
25:               p(x, i₂) = 1
26:            end if
27:         end if
28:      end for
29:   end for
``` where the output of the algorithm is the processed synthetic seismic dataset and given by p(x, t). FIG. 4C shows the processed synthetic seismic dataset with a non-zero point always located at a corresponding local maximum.

Figure 5A:
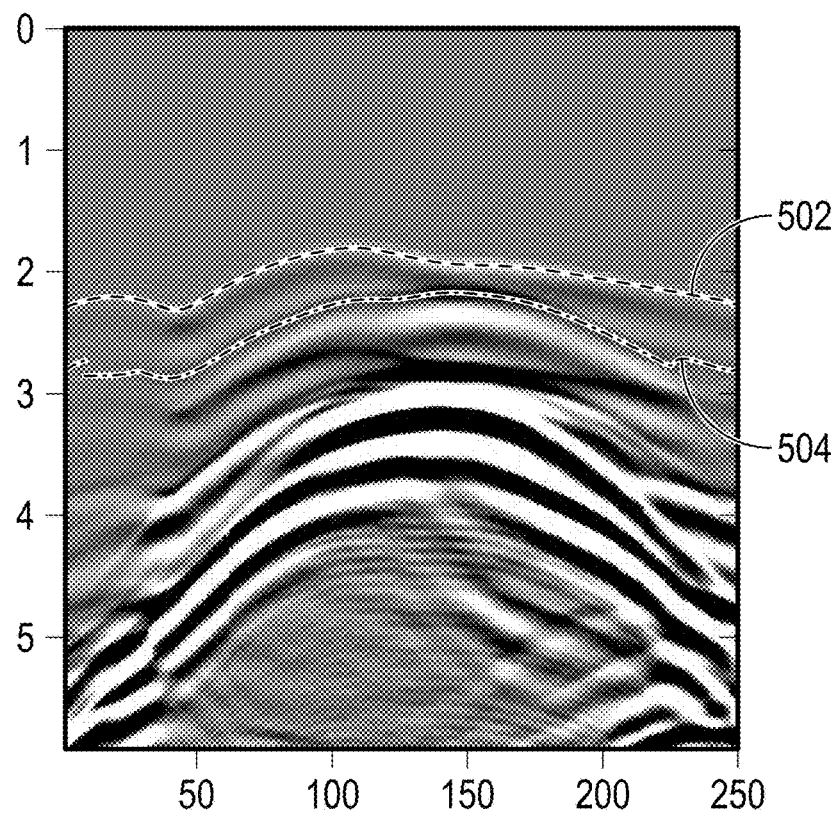
FIGS. 5A and 5B show seismic data processing steps in accordance with one or more embodiments.
Figure 5B:
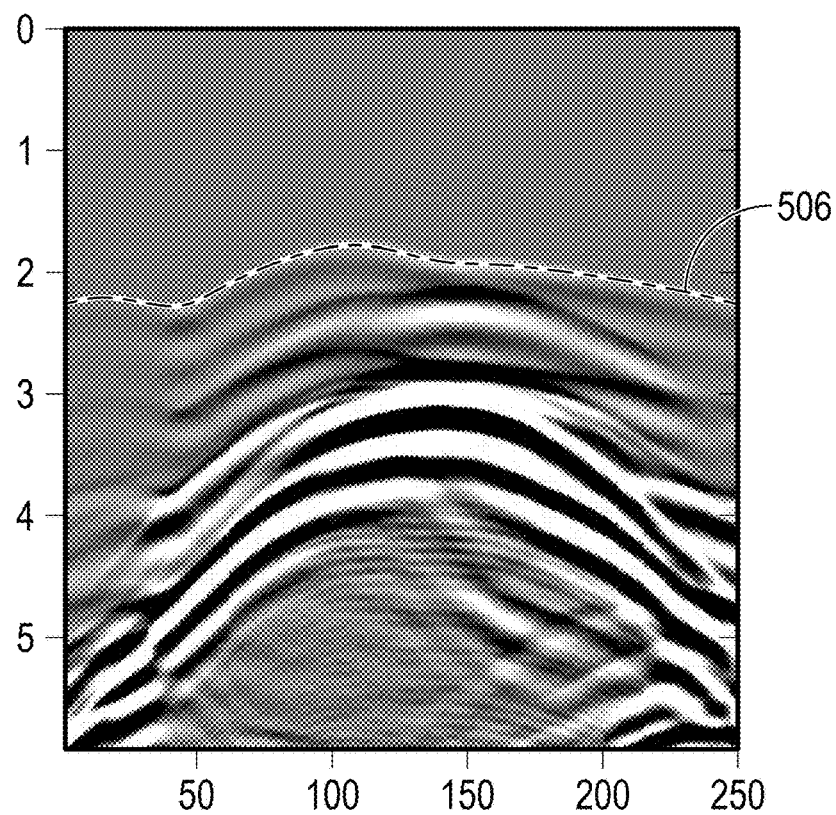

FIGS. 5A and 5B shows two first break corridors and the final first break picks in accordance with one or more embodiments. The two first break corridors and the final first break picks are shown overlaid on the input dataset, first introduced in FIG. 3A. The horizontal axis in FIGS. 5A and 5B represents the horizontal location and the vertical axis represents time or depth increasing downward. Inputting the new processed synthetic seismic dataset, two first break corridors $f_1(x)$ (502) and $f_2(x)$ (504) may be calculated by tracking nearest points in the processed dataset p(x, t). The $1^{st}$ first break corridor or the positive first break candidates is computed by tracking the earlier non-zero value from the third mask from shortest offset to longest offset. This may be performed, for example, by Algorithm 2 found below.

---

Algoritm 2. Computing FB picks via tracking nearest point using processed data

Input : p(x, t)
Output : $f_1(x)$
1:  $x_0 \leftarrow$ the spatial index of the data d(x, t) corresponding to the minimum offset
2:  $x_1 \leftarrow$ the spatial index of the data d(x, t) corresponding to the maximum offset
3:  nt $\leftarrow$ the number of time samplings
4:  for t = 0 to t = $t_{nt}$ do
5:      if p($x_0$, t) ≠ 0 then
6:          t' $\leftarrow$ t
7:          f($x_0$) $\leftarrow$ t'
8:          exit
9:      end if
10: end for
11: for x = $x_0$ + 1 to x = $x_1$ do
12:     $i_1$ = t'
13:     for j = t' to j = 0 do
14:         if p(x, j) ≠ 0 then
15:             $i_1$ $\leftarrow$ j
16:             exit
17:         end if
18:     end for
19:     $i_2$ = t'
20:     for j = t' to j = $t_{nt}$ do
21:         if p(x, j) ≠ 0 then
22:             $i_2$ $\leftarrow$ j
23:             exit
24:         end if
25:     end for
26:     if t' - $i_1$ ≤ t' - t then
27:         t' $\leftarrow$ $i_1$
28:     else
29:         t' $\leftarrow$ $i_2$
30:     end if
31:     $f_1(x)$ $\leftarrow$ t'
32: end for

--- where $f_1(x)$ (502) is the $1^{st}$ first break corridor in FIG. 5A.

The method to obtain $f_1(x)$ (502), in accordance with one or more embodiments, may be determined from starting with a synthetic dataset comprising local maxima and relies on an abrupt change of energy (as indicated by MER) with respect to time and continuity of signal with respect to the space. Any unexpected change of amplitude or wavefield of the first break due to interference among seismic signals may result in a less accurate first break pick. A second first break candidate, $f_2(x)$ (504) or negative first break pick candidates is also determined by repeating the disclosed method, with a synthetic dataset composed with local minima, instead of maxima. The signal interference will not be present at both the positive and negative sign of the first break signal at the same time. Having first break candidates determined for both the maxima and mimina datasets ensure that at least one first break pick candidate will be free from interference.

A synthetic seismic dataset (may be used in Equation (1)) to generate an array of local maxima, shown in FIG. 3B. This array of local maxima contains valuable first arriving event (201) amplitude information gathered in the near offset.

This local minima dataset may be determined by reversing the amplitude or multiplying the synthetic seismic dataset by negative one, prior to calculating the new local maxima. The local maxima specifically derived from the amplitude reversal synthetic seismic data is equivalent to determining the local minima.

Compute the $2^{nd}$ first break corridor, $f_2(x)$ (504), may be performed by repeating each of the steps used to compute the $1^{st}$ first break corridor after reversing the polarity of the data. The polarity of the data may be reversed by multiplying the amplitude of each sample by negative one. If $f_2(x)$, is later that $f_1(x)$, then $f_2(x)$ is moved to the nearest upper maximum and if $f_2(x)$ is located earlier than $f_1(x)$ then $f_1(x)$ is moved to the nearest maximum. Then a final first break point is chosen between corridor $f_1(x)$ and $f_2(x)$ in each trace, given by:

$$f(x)=\min(f_1(x),f_2(x)) \quad \text{Equation (7)}$$

where the final first break pick (506) is given by FIG. 5B. The method of obtaining the first break corridors, or the positive and negative estimate first break candidates is discussed in more detail in FIGS. 7 and 8.

Figure 6:
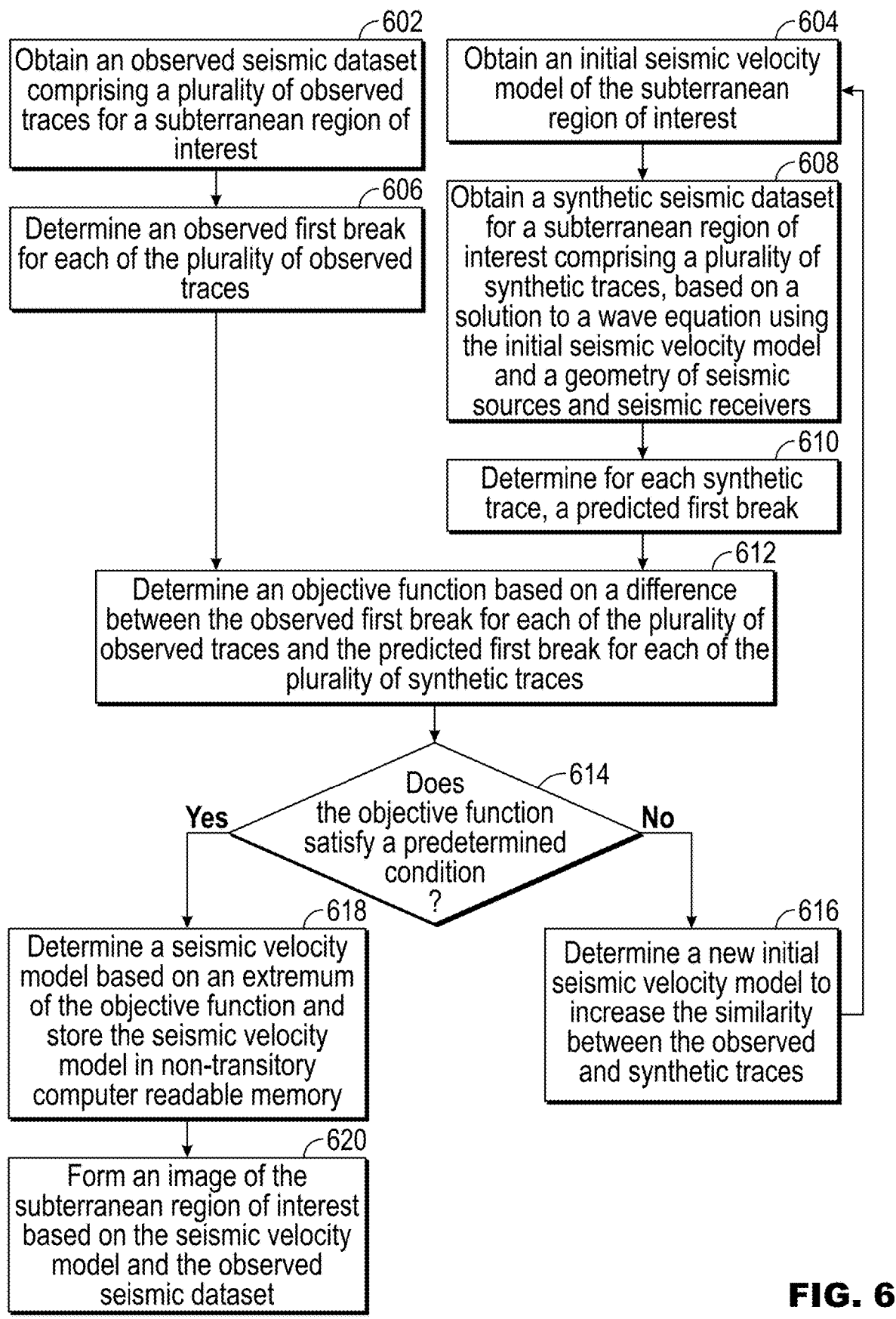
FIG. 6 shows a flowchart in accordance with one or more embodiments.

FIG. 6 shows a flowchart describing an exemplary embodiment of full wavefield travel-time inversion (FWTI). FWTI is a method of inverting measured seismic data to generate a multidimensional seismic velocity model of a region of interest by minimizing travel-time differences between the first break points of the observed dataset and first break points of the synthetic dataset. The multidimensional model may be 3D, 2D, or one dimensional ("1D"), depending upon the application and measurement distribution.

In Step 602, an observed seismic dataset comprising a plurality of time-domain observed seismic traces for a subterranean region of interest is obtained. The observed seismic dataset may contain a plurality of observed seismic traces recorded for each of a plurality of seismic source excitations. Typically, there may be hundreds of thousands of observed seismic traces for each seismic source excitation and tens of thousands of seismic source excitations in an observed seismic dataset.

In Step 604, an initial seismic velocity model for the subterranean region of interest is obtained. The seismic velocity model may be obtained from acoustic well logs or well seismic datasets. The seismic velocity model may be determined from the observed seismic dataset obtained in Step 602 using approximate methods such as normal moveout analysis, Kirchhoff velocity analysis, or seismic velocity tomography. The initial seismic velocity model may be obtained from another observed seismic dataset for the subterranean region of interest. The initial seismic velocity model may be one dimensional (1D), typically containing seismic speeds that only change with depth. Alternatively, the initial seismic velocity model may be 2D, typically varying with depth and one horizontal direction, or the initial seismic velocity model may vary in all three dimensions (3D).

In Step 606, an observed first break for each of the plurality of observed traces. Observed traces may have characteristics that differ from synthetic traces. For example, they may contain noise, bias, and malfunctioning "dead" receivers. Thus, picking first breaks from observed traces may require techniques that differ from those suitable for synthetic traces. In Step 606, any one of many first break picking techniques for observed traces well known to one of ordinary skill in the art may be used without departing from the scope of this disclosure, including manual picking, machine learning methods, modified energy ratio (MER) method and Coppens' method. In Step 608, a synthetic seismic dataset for a subterranean region of interest comprises of a plurality of synthetic traces is obtained based on a solution to a wave equation using the initial seismic velocity model and a geometry of seismic sources and seismic receivers. Determining the synthetic seismic dataset may involve solving a wave equation or an approximation to the wave equation for a plurality seismic source locations drawn from the observed seismic dataset and recording the simulated ground motion for a plurality of seismic receiver locations drawn from the observed seismic dataset.

In Step 610, a predicted first break is determined for the synthetic seismic dataset. This step is further illustrated and described in detail in FIGS. 7 and 8.

In Step 612, in accordance with one or more embodiments, an objective function is formed based, at least in part, on the difference between the observed first break for each of the plurality of observed traces and the predicted first break for each of the plurality of synthetic traces. First break picks may be used in determining a more accurate velocity model in FWTI. Full wavefield travel-time inversion may be used to automatically estimate a kinematically accurate velocity model from seismic data, fully dependent on travel-time information. Step 612 is described below in more detail in connection with FIG. 7.

In Step 614, the FWTI may be checked for convergence. In accordance with one or more embodiments, the check for convergence may comprise evaluating the objective function and determining if the value of the objective function is below a preselected value, where the preselected value quantifies a satisfactory degree of similarity between the synthetic first break picks and the measured first break picks. Alternatively, convergence may be determined by the iteration at which the value of the objective function ceases to decrease by more than a preselected amount between the current iteration and the previous iteration.

If the FWTI has converged, the seismic velocity model determined based on the extremum of the objective function, may be designated as the final updated seismic velocity model and stored in a non-transitory computer readable memory in Step 618, and an image of the subterranean region of interest is formed based on the seismic velocity model and the observed seismic dataset in Step 620. If the FWTI has not converged, according to Step 616, the update to the initial seismic velocity model may be added to the initial seismic velocity model to form an updated starting initial seismic velocity model of the subterranean region of interest to be used in Step 604. The process is then repeated from Step 604, with the updated starting initial velocity model until convergence has been achieved.

Figure 7:
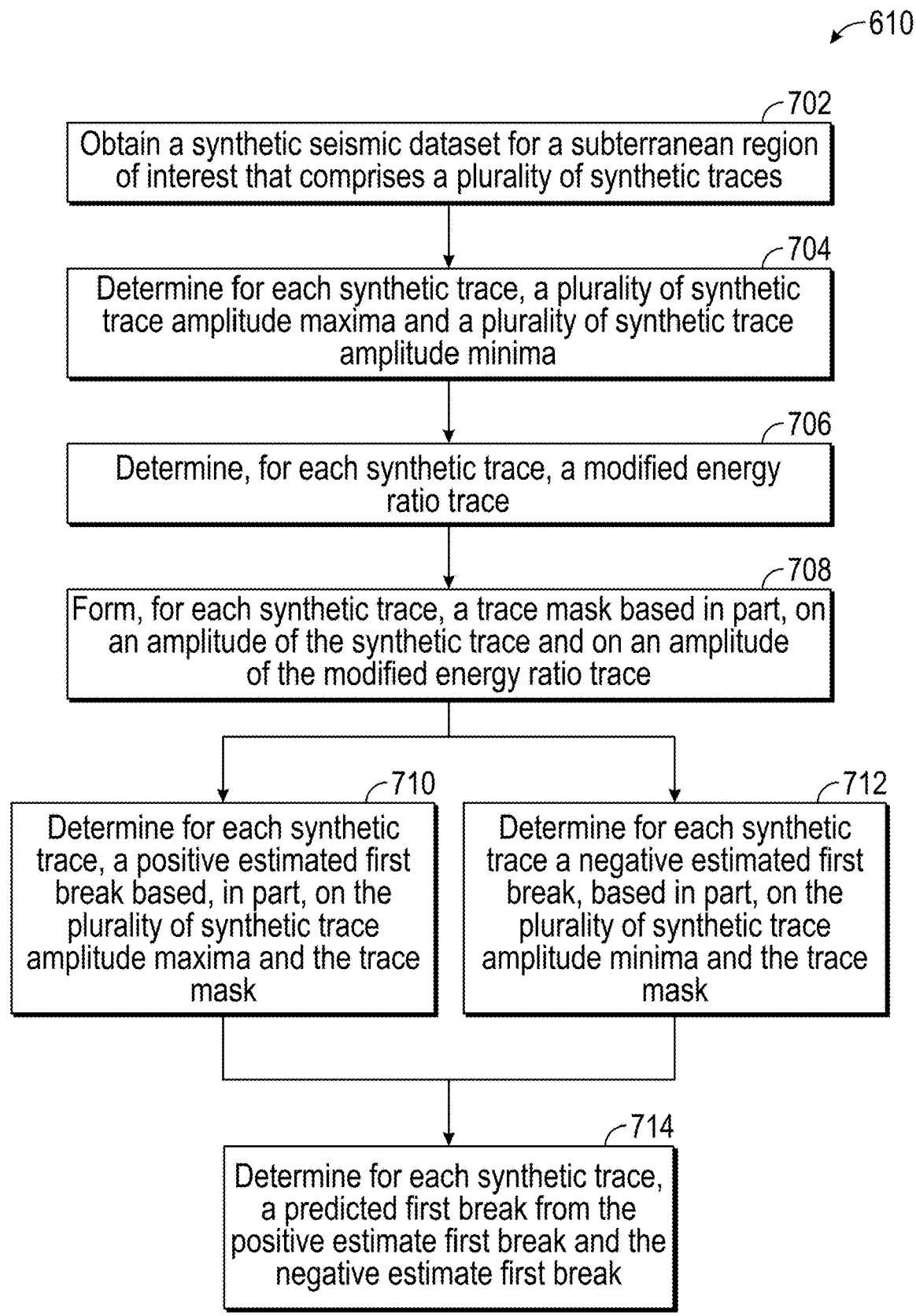
FIG. 7 shows a flowchart in accordance with one or more embodiments.

FIG. 7 describes how a first break for each synthetic trace may be determined in accordance with one or more embodiments. In Step 702, a synthetic seismic dataset for a subterranean region of interest comprising of a plurality of synthetic traces is obtained. In Step 704, a plurality of synthetic trace amplitude maxima and a plurality of synthetic trace amplitude minima is determined for each synthetic trace. A plurality of maxima and minima are shown in FIGS. 2 as 204, and 205 and Equation (1) describes the method for selecting a plurality of maxima. Equation (1) may also be used to select a plurality of minima by multiplying the synthetic dataset by negative one. In Step 706, a modified energy ratio trace is determined for each synthetic trace and is described by Equation (4). In Step 708, A trace mask based in part, on an amplitude of the synthetic trace and on an amplitude of the modified energy ratio trace is formed.

In Step 710, a positive estimated first break is determined for each synthetic trace, based in part, on the plurality of synthetic trace amplitude maxima and a trace mask. In Step 712, a negative estimated first break is determined for each synthetic trace, based in part, on the plurality of synthetic trace amplitude minima and a trace mask. In Step 714, a predicted first break is determined for each synthetic trace from the positive estimate first break and the negative estimate first break. The predicted first break is taken as the earliest candidate between the positive estimate first break and the negative estimate first break described by Equation (7). The methods to obtain a final first break positive candidate (710) is discussed more in FIG. 8, including more details on the trace mask formation.

Figure 8:
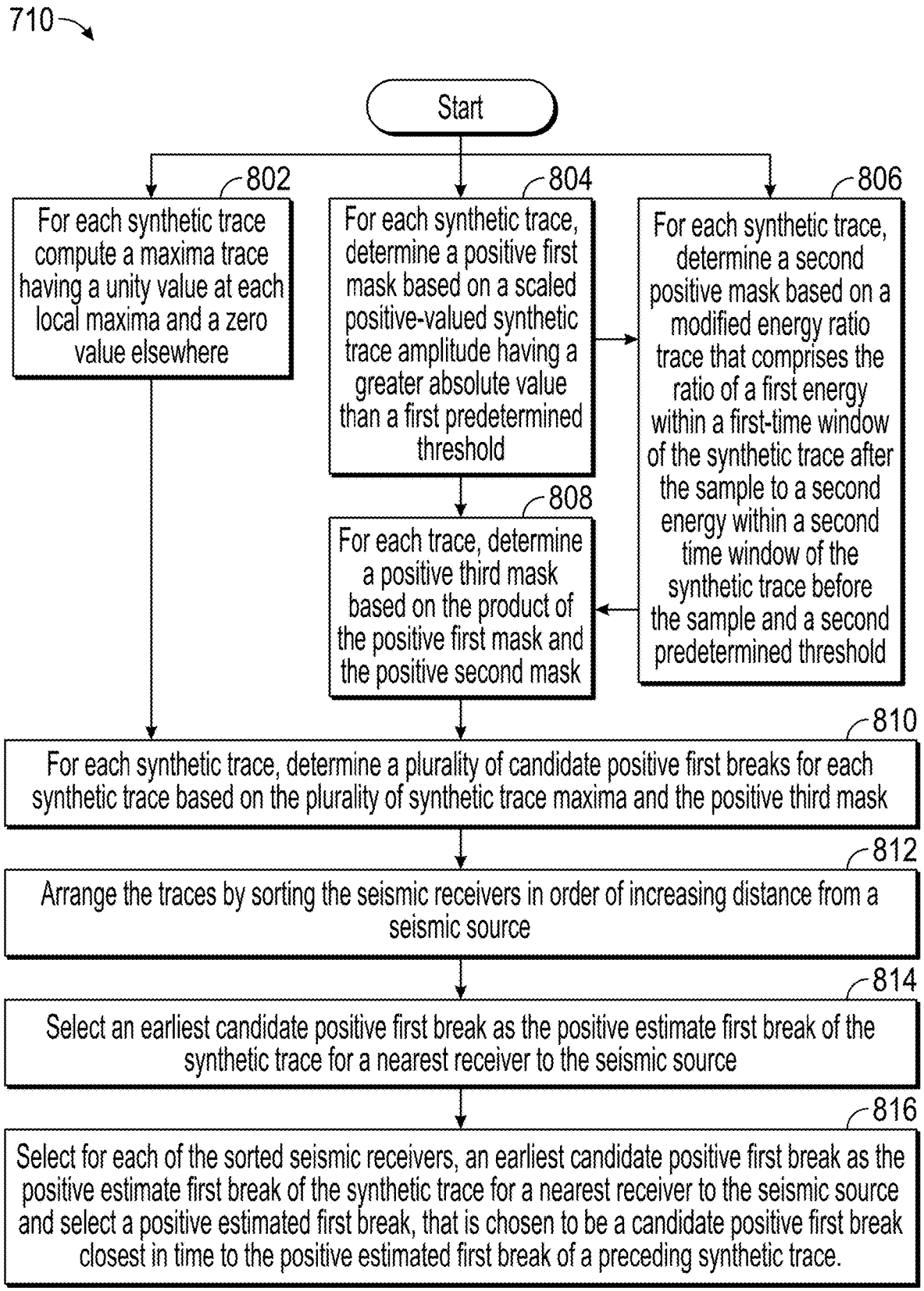
FIG. 8 shows a flowchart in accordance with one or more embodiments.

FIG. 8 shows, in accordance with one or more embodiments, a method to obtain final first break pick positive candidates. FIG. 8 provides more detail on Step 710 from FIG. 7 and describes determining the positive estimated first break for each synthetic trace based on the plurality of synthetic trace amplitude maxima and a trace mask that comprises a first mask, a second mask and a third mask. In Step 802, for each synthetic trace, a maxima trace is computed having a unity value at each local maximum and a zero value elsewhere.

In Step 804, for each synthetic trace, a positive first mask is determined based on a scaled positive-valued synthetic trace amplitude having a greater absolute value than a first predetermined threshold. Amplitude balancing may be performed to scale any anomalous trace amplitudes that may exist in the synthetic dataset. Equation (2) may be used to perform amplitude balancing. The positive first mask may then be determined by amplitude thresholding. The positive first mask may then be determined using Equation (3). The positive first mask may have a number of samples equal to the number of samples in the scaled positive-valued synthetic trace. A value of zero may be assigned to each sample of the positive first mask except where the corresponding value of the scaled positive-valued synthetic trace exceeds an amplitude threshold. For these samples, a value of unity may be assigned to the sample of the first positive mask. The amplitude threshold may be determined, at least in part, from an average value of the scaled positive-valued synthetic trace.

In Step 806, for each synthetic trace, a second positive mask may be determined based on a modified energy ratio (MER) trace. A MER for a sample of the synthetic trace may be determined as the ratio of the energy within a first-time window of the synthetic trace to the energy within a second time window of the synthetic trace. The first window may follow the sample of the synthetic trace and the second window may precede the sample of the synthetic trace. The MER trace may be calculated using Equation (4).

The positive second mask may be determined based on the MER trace. The second positive mask may be assigned non-zero values only for samples where the MER trace exceeds a threshold value for every trace within a time window before and after the sample. In some embodiments, the threshold value may be selected such that only the large quintile of MER values exceed threshold. The second positive mask may be calculated using Equation (6)

In Step 808, in accordance with one or more embodiments, a positive third mask may be determined from the product of the positive first mask and the positive second mask created in Steps 804 and 806.

In accordance with one or more embodiments, in Step 810 a plurality of candidate positive first break picks, also referred to as a first break corridor, may be determining for each synthetic trace. Each candidate positive first break picks may be determined based on a maximum of the synthetic trace and the positive third mask determined in step 808.

In Step 812, the traces are sorted in order of increasing distance from a seismic source to the seismic receiver corresponding to the synthetic trace. In accordance with one or more embodiments, in Step 814 select, for the receiver nearest the seismic source, the earliest candidate positive first break as the positive estimate first break for nearest receiver.

In Step 816, taking each synthetic trace in order of increasing offset, determine an earliest candidate positive first break as the positive estimate first break of the synthetic trace for a nearest receiver to the seismic source and a positive estimated first break, that is chosen to be a candidate positive first break closest in time to the positive estimated first break of a preceding synthetic trace is selected.

In step 816, the positive estimated first breaks for a plurality of synthetic traces can be described as being first break corridors $f_1(x)$. The $1^{st}$ first break corridor is computed by tracking the earlier non-zero value from the positive third mask from shortest offset to longest offset. This tracking method is described, for example, by Algorithm 2.

FIG. 8 has outlined a method to determine the positive estimated first break, based at least in part, of the plurality of synthetic trace amplitude maxima and expanded on Step 710 from FIG. 7. The method described by FIG. 8 may also be repeated to determine the negative estimated first break, expanding on Step 712 from FIG. 7, by computing a minima trace having a unity value at each local minima and a zero value elsewhere in Step 802. The other steps may be repeated in sequence to determine the negative estimated first breaks. The positive estimated first breaks and the negative estimated first breaks are both used in Step 714 from FIG. 7, to determine the predicted first break.

Figure 9:
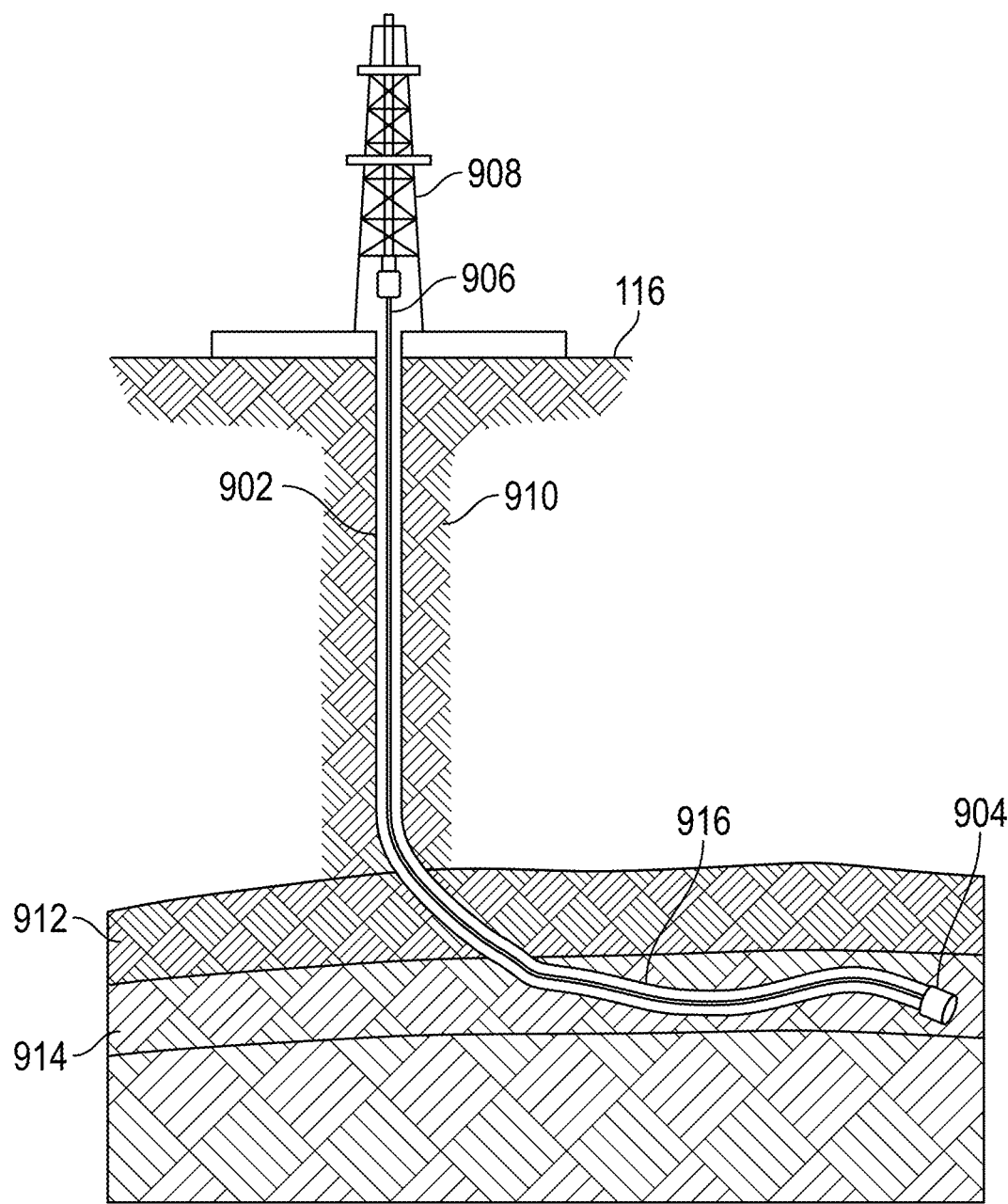
FIG. 9 shows a system in accordance with one or more embodiments.

FIG. 9 illustrates a system in accordance with one or more embodiments. A well (902) may be drilled by a drill bit (904) attached by a drillstring (906) to a drill rig (908) located on the surface of the earth (116). The well may traverse a plurality of overburden layers (910) and one or more caprock layers (912) to a hydrocarbon reservoir (914). In accordance with one or more embodiments, the updated seismic velocity model, may be used to plan and perform the curved well path (916). An image of the subterranean region of interest may formed using the updated seismic velocity model and the observed seismic dataset, and the curved well path (916) may be planned based, at least in part, on the image.

Figure 10:
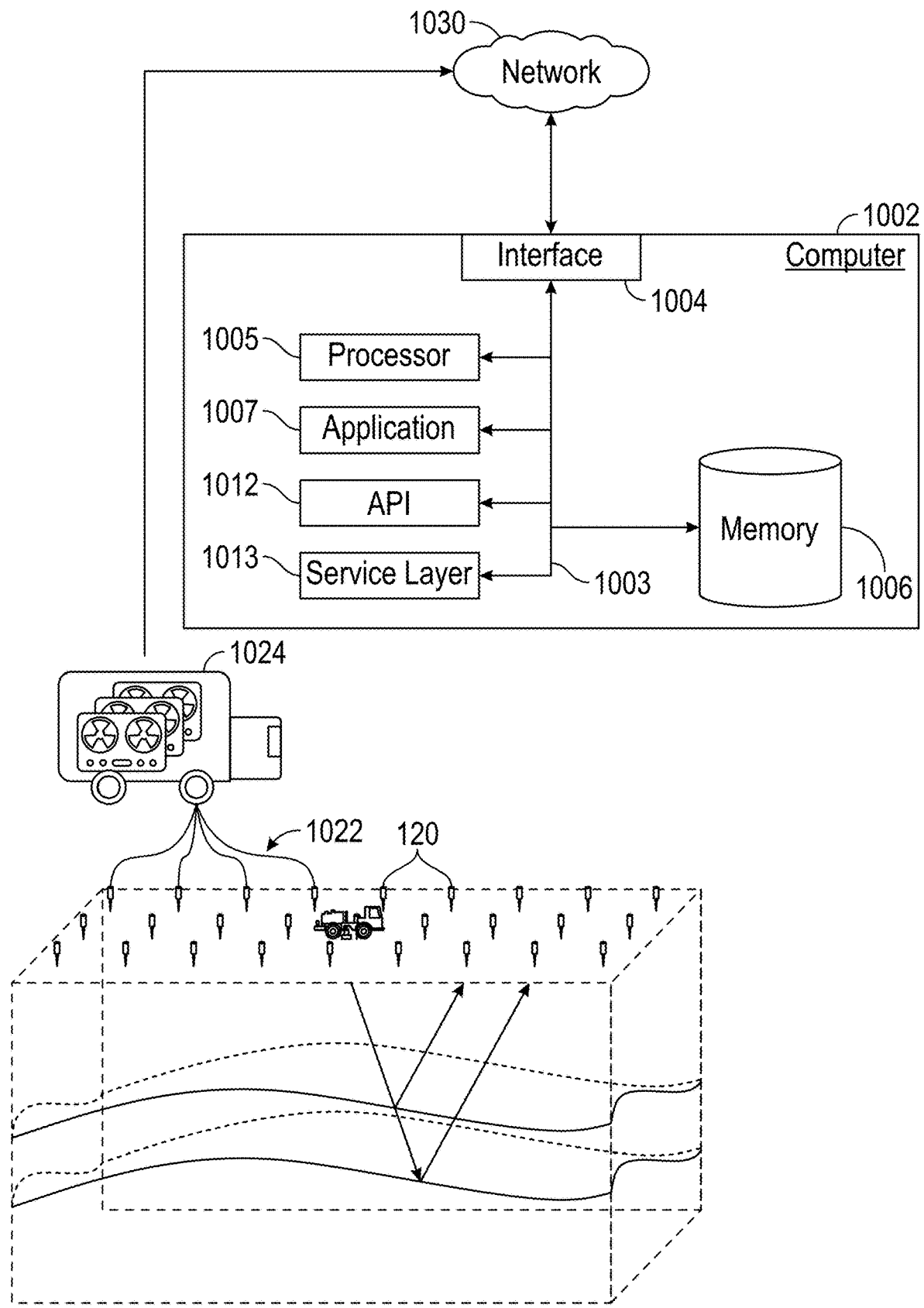
FIG. 10 shows a system in accordance with one or more embodiments.

FIG. 10 shows a seismic recording and processing system, in accordance with one or more embodiments. The data recorded by a plurality of seismic receivers (120) may be transmitted to a seismic recording facility (1024) located in the neighborhood of the seismic survey. The seismic recording facility may be one or more seismic recording trucks (1024). The plurality of seismic receivers (120) may be in digital or analogue telecommunication with the seismic recording facility (1024). The telecommunication may be performed over telemetry channels (1022) that may be electrical cables, such as coaxial cables, or may be performed wireless using wireless systems, such as Wi-Fi or Bluetooth. Digitization of the seismic data may be performed at each seismic receiver (120), or at the seismic recording facility (1024), or at an intermediate telemetry node (not shown) between the seismic receiver (120) and the seismic recording facility (1024).

The seismic data may be recorded at the seismic recording facility (1024) and stored on non-transitory computer memory. The computer memory may be one or more computer hard-drives, or one or more computer memory tapes, or any other convenient computer memory media familiar to one skilled in the art. The seismic data may be transmitted to a computer (1002) for processing. The computer (1002) may be located in or near the seismic recording facility (1024) or may be located at a remote location, that may be in another city, country, or continent. The seismic data may be transmitted from the seismic recording facility (1024) to a computer (1002) for processing. The transmission may occur over a network (1030) that may be a local area network using an ethernet or Wi-Fi system, or alternatively the network (1030) may be a wide area network using an internet or intranet service. Alternatively, seismic data may be transmitted over a network (1030) using satellite communication networks. Most commonly, because of its size, seismic data may be transmitted by physically transporting the computer memory, such as computer tapes or hard drives, in which the seismic data is stored from the seismic recording facility (1002) to the location of the computer (1002) to be used for processing.

FIG. 10 further depicts a block diagram of a computer system (1002) used to provide computational functionalities associated with described algorithms, methods, functions, processes, flows, and procedures as described in this disclosure, according to one or more embodiments. The illustrated computer (1002) is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (1002) may include a computer that includes an input device, such as a keypad, keyboard, touch screen, or other device that can accept user information, and an output device that conveys information associated with the operation of the computer (1002), including digital data, visual, or audio information (or a combination of information), or a GUI.

The computer (1002) can serve in a role as a client, network component, a server, a database or other persistency, or any other component (or a combination of roles) of a computer system for performing the subject matter described in the instant disclosure. The illustrated computer (1002) is communicably coupled with a network (1030). In some implementations, one or more components of the computer (1002) may be configured to operate within environments, including cloud-computing-based, local, global, or other environment (or a combination of environments).

At a high level, the computer (1002) is an electronic computing device operable to receive, transmit, process, store, or manage data and information associated with the described subject matter. According to some implementations, the computer (1002) may also include or be communicably coupled with an application server, e-mail server, web server, caching server, streaming data server, business intelligence (BI) server, or other server (or a combination of servers).

The computer (1002) can receive requests over network (1030) from a client application (for example, executing on another computer (1002)) and responding to the received requests by processing the said requests in an appropriate software application. In addition, requests may also be sent to the computer (1002) from internal users (for example, from a command console or by other appropriate access method), external or third-parties, other automated applications, as well as any other appropriate entities, individuals, systems, or computers.

Each of the components of the computer (1002) can communicate using a system bus (1003). In some implementations, any or all of the components of the computer (1002), both hardware or software (or a combination of hardware and software), may interface with each other or the interface (1004) (or a combination of both) over the system bus (1003) using an application programming interface (API) (1012) or a service layer (1013) (or a combination of the API (1012) and service layer (1013). The API (1012) may include specifications for routines, data structures, and object classes. The API (1012) may be either computer-language independent or dependent and refer to a complete interface, a single function, or even a set of APIs. The service layer (1013) provides software services to the computer (1002) or other components (whether or not illustrated) that are communicably coupled to the computer (1002). The functionality of the computer (1002) may be accessible for all service consumers using this service layer. Software services, such as those provided by the service layer (1013), provide reusable, defined business functionalities through a defined interface. For example, the interface may be software written in JAVA, C++, or other suitable language providing data in extensible markup language (XML) format or another suitable format. While illustrated as an integrated component of the computer (1002), alternative implementations may illustrate the API (1012) or the service layer (1013) as stand-alone components in relation to other components of the computer (1002) or other components (whether or not illustrated) that are communicably coupled to the computer (1002). Moreover, any or all parts of the API (1012) or the service layer (1013) may be implemented as child or sub-modules of another software module, enterprise application, or hardware module without departing from the scope of this disclosure.

The computer (1002) includes an interface (1004). Although illustrated as a single interface (1004) in FIG. 10, two or more interfaces (1004) may be used according to particular needs, desires, or particular implementations of the computer (1002). The interface (1004) is used by the computer (1002) for communicating with other systems in a distributed environment that are connected to the network (1030). Generally, the interface (1004 includes logic encoded in software or hardware (or a combination of software and hardware) and operable to communicate with the network (1030). More specifically, the interface (1004) may include software supporting one or more communication protocols associated with communications such that the network (1030) or interface's hardware is operable to communicate physical signals within and outside of the illustrated computer (1002).

The computer (1002) includes at least one computer processor (1005). Although illustrated as a single computer processor (1005) in FIG. 10, two or more processors may be used according to particular needs, desires, or particular implementations of the computer (1002). Generally, the computer processor (1005) executes instructions and manipulates data to perform the operations of the computer (1002) and any algorithms, methods, functions, processes, flows, and procedures as described in the instant disclosure.

The computer (1002) also includes a memory (1006) that holds data for the computer (1002) or other components (or a combination of both) that can be connected to the network (1030). For example, memory (1006) can be a database storing data consistent with this disclosure. Although illustrated as a single memory (1006) in FIG. 10, two or more memories may be used according to particular needs, desires, or particular implementations of the computer (1002) and the described functionality. While memory (1006) is illustrated as an integral component of the computer (1002), in alternative implementations, memory (1006) can be external to the computer (1002).

The application (1007) is an algorithmic software engine providing functionality according to particular needs, desires, or particular implementations of the computer (1002), particularly with respect to functionality described in this disclosure. For example, application (1007) can serve as one or more components, modules, applications, etc. Further, although illustrated as a single application (1007), the application (1007) may be implemented as multiple applications (1007) on the computer (1002). In addition, although illustrated as integral to the computer (1002), in alternative implementations, the application (1007) can be external to the computer (1002).

There may be any number of computers (1002) associated with, or external to, a computer system containing computer (1002), wherein each computer (1002) communicates over network (1030). Further, the term "client," "user," and other appropriate terminology may be used interchangeably as appropriate without departing from the scope of this disclosure. Moreover, this disclosure contemplates that many users may use one computer (1002), or that one user may use multiple computers (1002).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, any means-plus-function clauses are intended to cover the structures described herein as performing the recited function(s) and equivalents of those structures. Similarly, any step-plus-function clauses in the claims are intended to cover the acts described here as performing the recited function(s) and equivalents of those acts. It is the express intention of the applicant not to invoke 35 U.S.C. § 112(f) for any limitations of any of the claims herein, except for those in which the claim expressly uses the words "means for" or "step for" together with an associated function.

What is claimed is:

1. A method, comprising:
obtaining, using a computer processor, a synthetic seismic dataset for a subterranean region of interest, wherein the synthetic seismic dataset comprises a plurality of synthetic traces;
determining, using the computer processor, for each synthetic trace of the plurality of synthetic traces, a plurality of synthetic trace amplitude maxima and a plurality of synthetic trace amplitude minima;
determining, using the computer processor, a modified energy ratio trace from said each synthetic trace, wherein each sample of the modified energy ratio trace comprises the ratio of a first energy within a first time window of the synthetic trace after the sample to a second energy within a second time window of the synthetic trace before the sample;
forming, using the computer processor, for said each synthetic trace, a trace mask based, at least in part, on an amplitude of the synthetic trace and on an amplitude of the modified energy ratio trace;
determining, using the computer processor, for said each synthetic trace:
a positive estimated first break based, at least in part, on the plurality of synthetic trace amplitude maxima and the trace mask, and
a negative estimated first break based, at least in part, on the plurality of synthetic trace amplitude minima and the trace mask; and
determining, using the computer processor, for said each synthetic trace, a predicted first break from the positive estimate first break and the negative estimate first break.

2. The method of claim 1, further comprising:
obtaining an observed seismic dataset comprising a plurality of observed traces;
determining an observed first break for each of the plurality of observed traces;
forming an objective function based, at least in part, on a difference between the observed first break for each of the plurality of observed traces and the predicted first break for each of the plurality of synthetic traces; and
determining a seismic velocity model based, at least in part, on an extremum of the objective function.

3. The method of claim 2, further comprising:
forming an image of the subterranean region of interest based, at least in part, on the seismic velocity model and the observed seismic dataset.

4. The method of claim 1, wherein obtaining the synthetic seismic dataset comprises:
obtaining an initial seismic velocity model of the subterranean region of interest and a geometry of seismic sources and seismic receivers; and
determining the plurality of synthetic traces based on a solution to a wave equation.

5. The method of claim 1, wherein forming, for said each synthetic trace, a trace mask, comprises:
determining a first mask based, at least in part, on a scaled synthetic trace amplitude and a first predetermined threshold;
determining a second mask based, at least in part, a modified energy ratio trace and a second predetermined threshold; and
determining a third mask by forming a product of the first mask and the second mask.

6. The method of claim 1, wherein selecting for said each synthetic trace, the positive estimated first break comprises:
determining a positive first mask based, at least in part, on a scaled positive-valued synthetic trace amplitude having a greater absolute value than a first predetermined threshold; and
determining a plurality of candidate positive first breaks for said each synthetic trace based, at least in part, on the plurality of synthetic trace maxima and a positive third mask.

7. The method of claim 1, wherein selecting for said each synthetic trace, the positive estimated first break further comprises:
sorting seismic receivers in order of increasing distance from a seismic source;
selecting an earliest candidate positive first break as the positive estimate first break of the synthetic trace for a nearest receiver to the seismic source; and
selecting, for each of the sorted receivers in order of increasing distance from the seismic source, a positive estimated first break, wherein the positive estimated first break is chosen to be a candidate positive first break closest in time to the positive estimated first break of a preceding synthetic trace.

8. The method of claim 1, wherein selecting for said each synthetic trace, a negative estimated first break comprises:
determining a negative first mask based, at least in part, on a scaled negative-valued synthetic trace amplitude having a greater absolute value than a first predetermined threshold; and
determining a negative estimated first break of said each synthetic trace based, at least in part, on the plurality of synthetic trace minima and the negative first mask.

9. The method of claim 7, wherein selecting for said each synthetic trace, the negative estimated first break further comprises:
sorting seismic receivers in order of increasing distance from the seismic source;
selecting an earliest candidate negative first break as the negative estimated first break of the synthetic trace for the nearest receiver to the seismic source; and
selecting, for each of the sorted receivers in order of increasing distance from the seismic source, a negative estimated first break, wherein the negative estimated first break is chosen to be a candidate negative first break closest in time to the negative estimated first break for the preceding synthetic trace.

10. The method of claim 1, wherein determining, for said each synthetic trace, the predicted first break comprises selecting the earlier of the positive estimated first break and the negative estimated first break.

11. A non-transitory computer readable medium storing instructions executable by a computer processor, the instructions comprising functionality for:

obtaining, using a computer processor, a synthetic seismic dataset for a subterranean region of interest, wherein the synthetic seismic dataset comprises a plurality of synthetic traces;

determining, using the computer processor, for each synthetic trace of the plurality of synthetic traces, a plurality of synthetic trace amplitude maxima and a plurality of synthetic trace amplitude minima;

determining, using the computer processor, a modified energy ratio trace from said each synthetic trace, wherein each sample of the modified energy ratio trace comprises the ratio of a first energy within a first time window of the synthetic trace after the sample to a second energy within a second time window of the synthetic trace before the sample;

forming, using the computer processor, for said each synthetic trace, a trace mask based, at least in part, on an amplitude of the synthetic trace and on an amplitude of the energy ratio trace;

determining, using the computer processor, for said each synthetic trace:
 a positive estimated first break based, at least in part, on the plurality of synthetic trace amplitude maxima and the trace mask, and
 a negative estimated first break based, at least in part, on the plurality of synthetic trace amplitude minima and the trace mask; and determining, using the computer processor, for said each synthetic trace, a predicted first break from the positive estimate first break and the negative estimate first break.

12. The non-transitory computer readable medium of claim 11, further comprising:
 obtaining an observed seismic dataset comprising a plurality of observed traces;
 determining an observed first break for each of the plurality of observed traces;
 forming an objective function based, at least in part, on a difference between the observed first break for each of the plurality of observed traces and the predicted first break for each of the plurality of synthetic traces; and
 determining a seismic velocity model based, at least in part, on an extremum of the objective function.

13. The non-transitory computer readable medium of claim 12, further comprising:
 forming an image of the subterranean region of interest based, at least in part, on the seismic velocity model and the observed seismic dataset.

14. The non-transitory computer readable medium of claim 11, wherein obtaining the synthetic seismic dataset comprises:
 obtaining an initial seismic velocity model of the subterranean region of interest and a geometry of seismic sources and seismic receivers; and
 determining the plurality of synthetic traces based on a solution to a wave equation.

15. The non-transitory computer readable medium of claim 11, wherein forming, for said each synthetic trace, a trace mask, comprises:
 determining a first mask based, at least in part, on a scaled synthetic trace amplitude and a first predetermined threshold;
 determining a second mask based, at least in part, an energy ratio and a second predetermined threshold; and
 determining a third mask by forming a product of the first mask and the second mask.

16. The non-transitory computer readable medium of claim 11, wherein selecting for said each synthetic trace, the positive estimated first break comprises:
 determining a positive first mask based, at least in part, on a scaled positive-valued synthetic trace amplitude having a greater absolute value than a first predetermined threshold; and
 determining a plurality of candidate positive first breaks for said each synthetic trace based, at least in part, on the plurality of synthetic trace maxima and a positive third mask.

17. The non-transitory computer readable medium of claim 11, wherein selecting for said each synthetic trace, the positive estimated first break further comprises:
 sorting seismic receivers in order of increasing distance from a seismic source;
 selecting an earliest candidate positive first break as the positive estimate first break of the synthetic trace for a nearest receiver to the seismic source; and
 selecting, for each of the sorted receivers in order of increasing distance from the seismic source, a positive estimated first break, wherein the positive estimated first break is chosen to be a candidate positive first break closest in time to the positive estimated first break of a preceding synthetic trace.

18. The non-transitory computer readable medium of claim 11, wherein selecting for said each synthetic trace, a negative estimated first break comprises:
 determining a negative first mask based, at least in part, on a scaled negative-valued synthetic trace amplitude having a greater absolute value than a first predetermined threshold; and
 determining a negative estimated first break of said each synthetic trace based, at least in part, on the plurality of synthetic trace minima and the negative first mask.

19. The non-transitory computer readable medium of claim 17, wherein selecting for said each synthetic trace, the negative estimated first break further comprises:
 sorting seismic receivers in order of increasing distance from the seismic source;
 selecting an earliest candidate negative first break as the negative estimated first break of the synthetic trace for the nearest receiver to the seismic source; and
 selecting, for each of the sorted receivers in order of increasing distance from the seismic source, a negative estimated first break, wherein the negative estimated first break is chosen to be a candidate negative first break closest in time to the negative estimated first break for the preceding synthetic trace.

20. The non-transitory computer readable medium of claim 11, wherein determining, for said each synthetic trace, the predicted first break comprises selecting the earlier of the positive estimated first break and the negative estimated first break.

* * * * *